(12) United States Patent
K M et al.

(10) Patent No.: US 9,305,136 B2
(45) Date of Patent: Apr. 5, 2016

(54) DETERMINING A LAYOUT AND WIRING ESTIMATION FOR A HEATING, VENTILATION, AND AIR CONDITIONING SYSTEM OF A BUILDING

(75) Inventors: Sabari K M, Paramakudi (IN); Naga Sundar, Madurai (IN); Kirupakar J, Madurai (IN); Rajesh Kulandaivel Sankarapandian, Madurai (IN); Raveendran Manickam, Salem (IN)

(73) Assignee: Honeywell International Inc., Morristown, NJ (US)

( * ) Notice: Subject to any disclaimer, the term of this patent is extended or adjusted under 35 U.S.C. 154(b) by 322 days.

(21) Appl. No.: 13/565,521

(22) Filed: Aug. 2, 2012

(65) Prior Publication Data
US 2014/0039845 A1    Feb. 6, 2014

(51) Int. Cl.
*G06G 7/48* (2006.01)
*G06F 17/50* (2006.01)

(52) U.S. Cl.
CPC .......... *G06F 17/509* (2013.01); *G06F 2217/36* (2013.01)

(58) Field of Classification Search
CPC .......... G06F 15/16; G06F 17/50; G06F 17/30; G06F 1/28; G06F 3/048; G06F 15/46; G06G 7/63; G05B 15/00; G06Q 10/00; G09B 25/00; E04B 1/35; E04B 1/343; E04G 21/00; E04G 21/14; E04H 1/00; E04H 1/02; E04H 6/00; E04H 14/00
USPC .................. 703/1, 6, 7, 13; 709/230; 52/79.5; 707/102; 434/72; 705/7, 10; 700/291, 700/276; 345/964
See application file for complete search history.

(56) References Cited

U.S. PATENT DOCUMENTS

| | | | | |
|---|---|---|---|---|
| 3,670,764 | A | * | 6/1972 | Tindal ........................... 137/357 |
| 5,019,961 | A | * | 5/1991 | Addesso et al. ................ 700/87 |
| 5,237,826 | A |   | 8/1993 | Baldwin et al. |
| 5,975,908 | A | * | 11/1999 | Hulten ............................ 434/72 |
| 7,209,870 | B2 |   | 4/2007 | Simmons et al. |
| 2003/0229478 | A1 | * | 12/2003 | Rappaport et al. .............. 703/13 |
| 2004/0145614 | A1 | * | 7/2004 | Takagaki et al. .............. 345/964 |
| 2009/0062964 | A1 | * | 3/2009 | Sullivan et al. ............... 700/276 |
| 2009/0307255 | A1 | * | 12/2009 | Park ............................. 707/102 |
| 2010/0024318 | A1 | * | 2/2010 | Zhang et al. ................... 52/79.5 |
| 2010/0138272 | A1 | * | 6/2010 | Rackham ........................ 705/10 |
| 2010/0223032 | A1 | * | 9/2010 | Reghetti et al. ................... 703/1 |

(Continued)

OTHER PUBLICATIONS

Artur Krukowski, et al. Comprehensive Building Information Management System Approach. International Journal of Simulation Systems, Science & Technology, vol. 11, No. 3, pp. 12-28, May 2010.

(Continued)

*Primary Examiner* — Kandasamy Thangavelu
(74) *Attorney, Agent, or Firm* — Brooks, Cameron & Huebsch

(57) ABSTRACT

Devices, methods, and systems for determining a layout and wiring estimation for a heating, ventilation, and air conditioning (HVAC) system of a building are described herein. One method includes receiving information from a building information model associated with a building, receiving information from a pre-engineering tool associated with the building, and determining a layout and wiring estimation for an HVAC system of the building based, at least in part, on the information from the building information model and the information from the pre-engineering tool.

17 Claims, 2 Drawing Sheets

(56) References Cited

U.S. PATENT DOCUMENTS

| | | | |
|---|---|---|---|
| 2010/0235206 A1* | 9/2010 | Miller et al. | 705/7 |
| 2011/0015798 A1* | 1/2011 | Golden et al. | 700/291 |
| 2012/0072181 A1* | 3/2012 | Imani | 703/1 |
| 2012/0131217 A1* | 5/2012 | Delorme et al. | 709/230 |
| 2013/0085588 A1 | 4/2013 | Brun et al. | |

OTHER PUBLICATIONS

Andreas Fernbach, et al. Interoperability at the Management Level of Building Automation Systems: A Case Study for BACnet and OPC UA, IEEE ETFA. pp. 1-8. 2011.

* cited by examiner

DETERMINING A LAYOUT AND WIRING ESTIMATION FOR A HEATING, VENTILATION, AND AIR CONDITIONING SYSTEM OF A BUILDING

TECHNICAL FIELD

The present disclosure relates to devices, methods, and systems for determining a layout and wiring estimation for a heating, ventilation, and air conditioning system of a building.

BACKGROUND

A heating, ventilation, and air conditioning (HVAC) system can be used to control the environment of a building. For example, an HVAC system can be used to control the air temperature of different rooms, areas, and/or spaces of a building. An HVAC system can include a number of different components such as, for instance, HVAC devices (e.g., HVAC equipment).

When implementing (e.g., setting up and/or installing) an HVAC system in a building, for example, it may be desirable to first determine the layout and/or wiring estimation for the HVAC system, such as, for instance, the positioning in the building of the components of the HVAC system and/or the wiring needed for the HVAC system. Previous approaches for determining layouts and wiring estimations for HVAC systems, however, can be difficult, costly, and/or time consuming.

Further, in some instances, layouts and wiring estimations for HVAC systems determined in accordance with previous approaches can be inaccurate and/or wrong. That is, in some instances, the initially determined HVAC system layout and wiring estimation may differ from the actual implementation of the HVAC system. As a result of these inaccuracies and/or differences, the initial estimated cost for implementing the HVAC system may be inaccurate and/or wrong. That is, the initial estimated cost for implementing the HVAC system may differ (e.g., be less than) the actual (e.g., final) cost of implementing the HVAC system.

DETAILED DESCRIPTION

Figure 1:
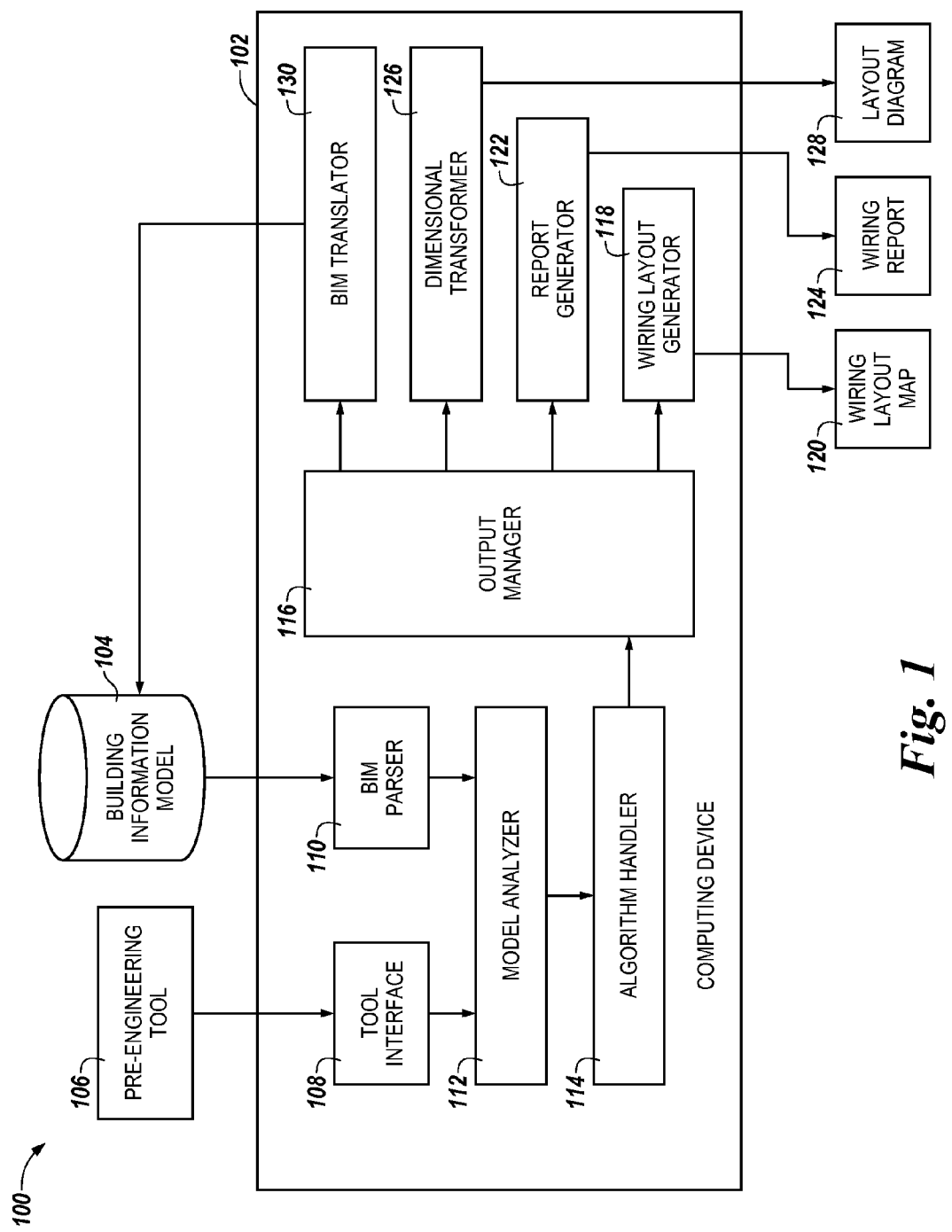
FIG. 1 illustrates a system for determining a layout and wiring estimation for a heating, ventilation, and air conditioning (HVAC) system of a building in accordance with one or more embodiments of the present disclosure.

Devices, methods, and systems for determining a layout and wiring estimation for a heating, ventilation, and air conditioning (HVAC) system of a building are described herein. For example, one or more embodiments include receiving information from a building information model associated with a building, receiving information from a pre-engineering tool associated with the building, and determining a layout and wiring estimation for an HVAC system of the building based, at least in part, on the information from the building information model and the information from the pre-engineering tool.

Determining a layout and wiring estimation for an HVAC system of a building in accordance with one or more embodiments of the present disclosure can be easier, cheaper, and/or less time consuming than previous approaches. Further, layouts and wiring estimations for HVAC systems determined in accordance with one or more embodiments of the present disclosure may be accurate and/or correct (e.g., may match the actual implementation of the HVAC system). Accordingly, the initial estimated cost for implementing the HVAC system may accurate and/or correct (e.g., may match the actual cost of implementing the HVAC system).

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of components" can refer to one or more components.

FIG. 1 illustrates a system 100 for determining a layout and wiring estimation for a heating, ventilation, and air conditioning (HVAC) system of a building in accordance with one or more embodiments of the present disclosure. As shown in FIG. 1, system 100 includes a computing device 102, a building information model (BIM) 104 associated with a building, and a pre-engineering tool 106 associated with the building.

Computing device 102 can be, for example, a laptop computer, a desktop computer, or a mobile device (e.g., a mobile phone, a personal digital assistant, etc.), among other types of computing devices.

Although one computing device is illustrated in FIG. 1, embodiments of the present disclosure are not so limited. For example, in some embodiments, a number of the elements of computing device 102 illustrated in FIG. 1 can be included in a number of different computing devices.

BIM 104 can include building information modeling data associated with the building (e.g, building information modeling data associated with the components, equipment, and/or properties of the building), such as, for example, architectural, mechanical, electrical, plumbing, sanitary, fire, geometrical, and/or spatial (e.g., spatial relationship) information associated with the building, and/or quantities and/or properties of the components and/or equipment of the building. For example, BIM 104 can include a floor plan (e.g., an architectural layout, such as an area, floor and/or room layout) of the building and HVAC devices (e.g., HVAC equipment) in (e.g., located and/or used in) the building, among other types of building information modeling data. The HVAC devices in the building can include, for example, a chiller(s) (e.g., chiller plant), boiler(s) (e.g., boiler plant), pump(s), fan(s), air damper(s) such as a variable air volume (VAV) damper, air handling unit(s) (AHUs) (e.g., AHU plant), coil(s) such as a heating and/or cooling coil, air filter(s), and/or cooling tower(s), among other HVAC devices.

BIM 104 (e.g., the building information modeling data of BIM 104) can be generated and/or managed by a building information modeling process (which can also be referred to as BIM). Such a BIM process can include, for example, representing a design as objects—vague and undefined, generic or product-specific, solid-shapes or void-space oriented (e.g., like the shape of a room)—that carry their geometry, relations, and/or attributes. BIM design tools can allow for extracting different views from a building model for drawing production and other uses. These different views can be automatically consistent (e.g., the objects can all be of a consistent size, location, and/or specification) since each object instance is defined only once. This consistency can eliminate many errors. Such a BIM process can use three-dimensional, real-time, dynamic building modeling software to increase productivity in building design and/or construction.

Pre-engineering tool 106 can be used (e.g., by an engineer) to configure the building with the equipment, devices, and controllers needed for operation of the building. For example, pre-engineering tool 106 can be used to select input/output (I/O) devices, controllers, and modules for the building, and determine the I/O assignments for the building (e.g., how the I/O devices are to be connected to the controllers).

As an example, pre-engineering tool 106 can include a wiring diagram for the HVAC system of the building. The wiring diagram can include an HVAC system controller (e.g., a controller for the HVAC system), a number of HVAC devices connected to the controller (e.g., by the wiring of the building), and a number of I/O points (e.g., assignments) of the HVAC system. The number of HVAC devices can be the HVAC devices of the HVAC system of the building that pre-engineering tool 106 determines need to be connected to the controller. That is, pre-engineering tool 106 can determine which of the HVAC devices of the HVAC system of the building are connected to the controller.

As shown in FIG. 1, BIM parser 110 of computing device 102 can receive information from BIM 104. The information received by BIM parser 110 from BIM 104 can include, for example, the BIM data associated with the building, such as the floor plan of the building and the HVAC devices in the building. BIM parser 110 can parse the information received from BIM 104, and split the parsed information into a number of building information objects (e.g., advisor objects).

As shown in FIG. 1, tool interface 108 of computing device 102 can receive information from pre-engineering tool 106. The information received by tool interface 108 from pre-engineering tool 106 can include, for example, the information about the controllers, devices, and their I/O assignments, such as the wiring diagram for the HVAC system of the building. Tool interface 108 can split the information received from pre-engineering tool 106 into a number of pre-engineering tool objects (e.g., advisor objects).

As shown in FIG. 1, model analyzer 112 of computing device 102 can receive the building information objects from BIM parser 110 and the pre-engineering tool objects from tool interface 108. Model analyzer 112 can analyze (e.g., manipulate) the received building information objects and pre-engineering tool objects. After analyzing the received building information objects and pre-engineering tool objects, model analyzer 112 can correlate the building information objects and pre-engineering tool objects into a single model for the HVAC system of the building, which can elaborate the structure of the building with the controllers, devise, and I/O assignments.

Algorithm handler 114 of computing device 102 can determine (e.g., provide, recommend, and/or calculate) a layout and wiring estimation for the HVAC system of the building based, at least in part, on the information from BIM 104 (e.g., the floor plan of the building and the HVAC devices in the building) and the information from pre-engineering tool 106 (e.g., the wiring diagram from the HVAC system of the building). For example, algorithm handler 114 can determine the best possible layout for the HVAC system based on the information from BIM 104 and pre-engineering tool 106. The layout for the HVAC system that is the best possible layout can be, for example, the cheapest and/or easiest possible layout to implement and/or operate, and/or the most efficient (e.g., most energy efficient) layout, which can depend on, for example, the particular parameters of the building.

The layout for the HVAC system of the building can include, for example, a recommended positioning (e.g., possible locations) in the building for the HVAC devices of the HVAC system. In some embodiments, the positioning in the building for the HVAC devices of the HVAC system can include a single (e.g., only one) position in the building (e.g., a single recommended and/or possible location in the building) for at least one of the HVAC devices, and in some embodiments, the positioning in the building for the HVAC devices of the HVAC system can include multiple (e.g., more than one) positions in the building (e.g., multiple recommended and/or possible locations in the building) for at least one of the HVAC devices. That is, algorithm handler 114 can recommend a single position and/or multiple positions in the building for the HVAC devices. For example, algorithm handler 114 can recommend a single position in the building for some of the HVAC devices, and multiple positions in the building for other HVAC devices.

In some embodiments, the wiring estimation for the HVAC system of the building can include a recommended and/or estimated wiring (e.g., cable) length of the HVAC system of the building (e.g., the length and/or amount of wiring needed for the HVAC system). Further, algorithm handler 114 can determine (e.g., estimate) the cost of the wiring and a wiring path (e.g., the most optimal wiring path) of the HVAC system. That is, the wiring estimation for the HVAC system can also include the cost of the wiring and the wiring path of the HVAC system. The most optimal wiring path of the HVAC system will be further described herein.

In some embodiments, algorithm handler 114 can determine the capacity of the HVAC system of the building. For example, algorithm handler 114 can determine the capacity of the AHU(s) and/or chiller(s) of the HVAC system. Algorithm handler 114 can determine the capacity of the HVAC system (e.g., the capacity of the AHU(s) and/or chiller(s)) based, at least in part, on the floor plan of the building. For example, algorithm handler 114 can determine the capacity of the HVAC system based on the orientation and/or latitude of the building, applications of the building, the dimensions of the building, the heights of the ceilings and/or false ceilings of the building, whether the roof of the building is exposed, the depths of the beams and/or projections of the columns of the building, the size and/or number of windows in the building, whether the windows are shaded, the materials of the walls, ceilings, and/or roof of the building, the temperatures (e.g., for all seasons) of dry and/or wet bulbs outside the building, the temperatures and relative humidity of dry bulbs inside the building, the number of people in the building, the type of activity of the people in the building (e.g., whether the people in the building are smoking), the lighting load and/or the type of lights in the building, the solar and/or transmission gain of the building, and/or the internal load of the rooms in the building, among other parameters from the floor plan of the building.

In some embodiments, algorithm handler 114 can determine (e.g., automatically) the ducting and/or piping design for the HVAC system of the building. That is, the layout for the HVAC system can include the ducting and/or piping design for the HVAC system. Algorithm handler 114 can determine the ducting and/or piping design for the HVAC system based, at least in part, on the floor plan of the building. Accordingly, any variation in the floor plan of the building could impact the ducting and/or piping design. The ducting and/or piping design can assist pre-engineering tool 106 in the selection of the I/O devices and controllers for the building.

Output manager 116 can save the layout and wiring estimation for the HVAC system of the building determined by algorithm handler 114, and can transfer the layout and wiring estimation to the output module(s) of computing device 102. For example, as shown in FIG. 1, output manager 116 can transfer the layout and wiring estimation to wiring layout generator 118 of computing device 102, which can generate a wiring layout map 120 for the HVAC system of the building. Wiring layout map 120 can be, for example, a depiction of the wiring path (e.g., the most optimal wiring path) for the HVAC system. The most optimal wiring path for the HVAC system can be, for example, the wiring path that is the shortest possible length and/or uses the least amount of wiring, and/or the wiring path that is cheapest and/or easiest to implement. In some embodiments, wiring layout map 120 can be customizable by a user according to the building architecture (e.g., the user can create their own customized wiring layout map by customizing wiring layout map 120).

Further, as shown in FIG. 1, output manager 116 can transfer the wiring estimation for the HVAC system of the building determined by algorithm handler 114 to report generator 122 of computing device 102, which can generate a wiring report 124 that includes the wiring length of the HVAC system of the building (e.g., the length and/or amount of wiring needed for the HVAC system). Wiring report 124 can be provided to a user (e.g., a vendor) in, for example, a generalized format that can be used for bidding and/or negotiation.

Further, as shown in FIG. 1, output manager 116 can transfer the layout for the HVAC system of the building determined by algorithm handler 114 to dimensional transformer 126 of computing device 102, which can generate a two-dimensional and/or three dimensional diagram 128 (e.g., file) of the layout. Layout diagram 128 can be provided to a user (e.g., a field engineer) in order to, for example, assist the user in visualizing the building during the commissioning process.

Further, as shown in FIG. 1, output manager 116 can transfer the layout and wiring estimation for the HVAC system of the building determined by algorithm handler 114 to BIM translator 130 of computing device 102, which can translate (e.g., convert) the layout and wiring estimation into BIM objects and send the translated layout and wiring estimation to BIM 104. That is, BIM 104 can be updated to include (e.g., store) the determined layout and wiring estimation for the HVAC system of the building.

Although not shown in FIG. 1, computing device 102 can include a memory and a processor coupled to the memory. The memory can be any type of storage medium that can be accessed by the processor to perform various examples of the present disclosure. For example, the memory can be a non-transitory computer readable medium having computer readable instructions (e.g., computer program instructions) stored thereon that are executable by the processor to determine a layout and wiring estimation for an HVAC system of a building in accordance with one or more embodiments of the present disclosure.

The memory can be volatile or nonvolatile memory. The memory can also be removable (e.g., portable) memory, or non-removable (e.g., internal) memory. For example, the memory can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory. Further, the memory can be located in computing device 102, or can be located internal to another computing resource (e.g., enabling computer readable instructions to be downloaded over the Internet or another wired or wireless connection).

Further, although not shown in FIG. 1, computing device 102 can also include a user interface. The user interface can include, for example, a display (e.g., a screen), a mouse, and/or a keyboard, among other components. The display can be, for instance, a touch-screen (e.g., the display can include touch-screen capabilities).

The user interface can provide (e.g., display and/or present) information to a user of computing device 102, and/or can receive information (e.g., input) from a user of computing device 102. For example, the user interface can provide the determined layout and wiring estimation for the HVAC system of the building (e.g., wiring layout map 120, wiring report 124, and/or layout diagram 128) to the user.

Figure 2:
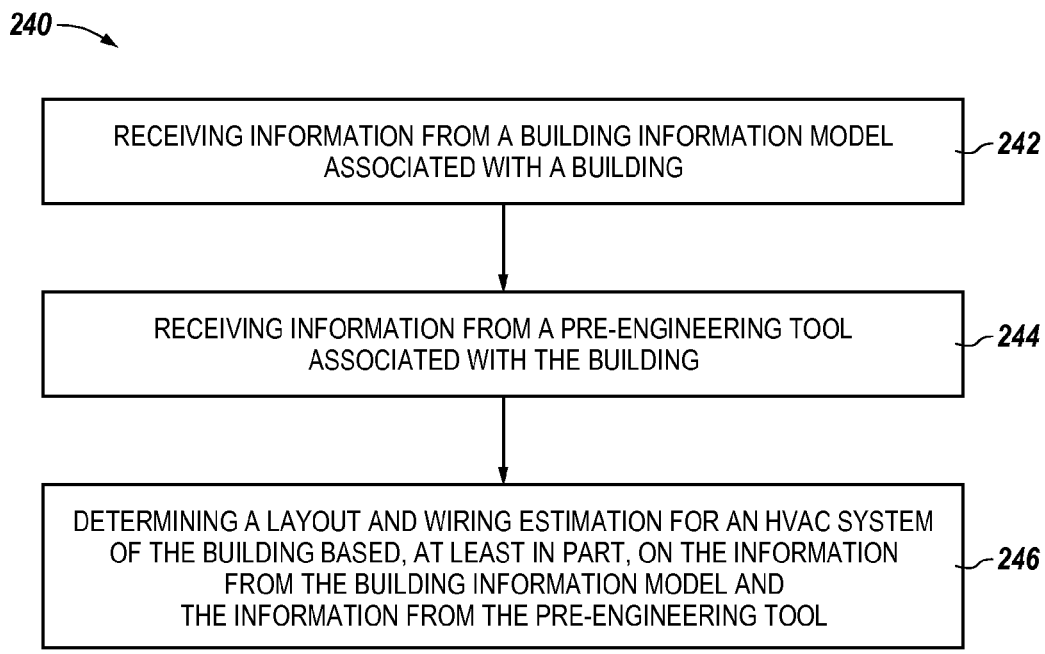
FIG. 2 illustrates a method for determining a layout and wiring estimation for an HVAC system of a building in accordance with one or more embodiments of the present disclosure.

FIG. 2 illustrates a method 240 for determining a layout and wiring estimation for an HVAC system of a building in accordance with one or more embodiments of the present disclosure. Method 240 can be performed, for example, by computing device 102 previously described in connection with FIG. 1.

At block 242, method 240 includes receiving information from a building information model associated with a building. The building information model can be, for example, BIM 104 previously described in connection with FIG. 1. The information received from the building information model can include, for example, building information modeling data associated with the building such as, for instance, the floor plan of the building and/or the HVAC devices in the building, as previously described herein (e.g., in connection with FIG. 1).

At block 244, method 240 includes receiving information from a pre-engineering tool associated with the building. The pre-engineering tool can be, for example, pre-engineering tool 106 previously described in connection with FIG. 1. The information received from the pre-engineering tool can include, for example, a wiring diagram for the HVAC system of the building, as previously described herein (e.g., in connection with FIG. 1).

At block 246, method 240 includes determining a layout and wiring estimation for an HVAC system of the building based, at least in part, on the information from the building information model and the information from the pre-engineering tool. The layout for the HVAC system of the building can be, for example, the best possible layout for the HVAC system, and can include, for example, a recommended positioning in the building for the HVAC devices of the HVAC system, as previously described herein (e.g., in connection with FIG. 1). The wiring estimation for the HVAC system of the building can include, for example, a recommended and/or estimated wiring length, cost of the wiring, and/or the wiring path of the HVAC system of the building, as previously described herein (e.g., in connection with FIG. 1).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computer implemented method for determining a layout and wiring estimation for a heating, ventilation, and air conditioning (HVAC) system of a building, comprising:
   receiving, by a computing device, information from a building information model associated with a building;
   receiving, by the computing device, a wiring diagram that includes a controller and a number of HVAC devices of an HVAC system of the building from a pre-engineering tool associated with the building, wherein the pre-engineering tool is separate from the building information model and determines which of the number of HVAC devices of the HVAC system need to be connected to the controller of the HVAC system in the wiring diagram based on a number of input/output (I/O) assignments for the HVAC devices of the HVAC system, and wherein the number of HVAC devices of the HVAC system include at least one of a chiller, a boiler, a pump, a fan, an air damper, an air handling unit, a coil, an air filter, and a cooling tower; and
   determining, by the computing device, a layout and wiring estimation for the HVAC system of the building based, at least in part, on the information from the building information model and the wiring diagram from the pre-engineering tool that is separate from the building information model, wherein the determined wiring estimation for the HVAC system of the building includes a wiring length of the HVAC system of the building.

2. The method of claim 1, wherein the information from the building information model includes a floor plan of the building.

3. The method of claim 1, wherein the information from the building information model includes the number of HVAC devices in the building.

4. The method of claim 1, wherein the layout for the HVAC system of the building includes a positioning in the building for the number of HVAC devices of the HVAC system.

5. A computing device for determining a layout and wiring estimation for a heating, ventilation, and air conditioning (HVAC) system of a building, comprising:
   a building information model parser configured to receive information from a building information model associated with a building;
   a tool interface configured to receive a wiring diagram that includes a controller and a number of HVAC devices of an HVAC system of the building from a pre-engineering tool associated with the building, wherein the pre-engineering tool is separate from the building information model and determines which of the number of HVAC devices of the HVAC system need to be connected to the controller of the HVAC system in the wiring diagram based on a number of input/output (I/O) assignments for the HVAC devices of the HVAC system, and wherein the number of HVAC devices of the HVAC system include at least one of a pump, a fan, an air damper, a coil, and an air filter; and
   an algorithm handler configured to determine a layout and wiring estimation for the HVAC system of the building based, at least in part, on the information from the building information model and the wiring diagram from the pre-engineering tool that is separate from the building information model, wherein the layout and wiring estimation for the HVAC system of the building includes:
      a positioning in the building for the number of HVAC devices of the HVAC system; and
      a wiring length and wiring path of the HVAC system.

6. The computing device of claim 5, wherein the algorithm handler is configured to determine a cost of the wiring of the HVAC system of the building.

7. The computing device of claim 5, wherein the positioning in the building for the number of HVAC devices of the HVAC system includes a single position in the building for at least one of the number of HVAC devices.

8. The computing device of claim 5, wherein the positioning in the building for the number of HVAC devices of the HVAC system includes multiple positions in the building for at least one of the number of HVAC devices.

9. The computing device of claim 5, wherein:
   the building information model parser is configured to:
      parse the information from the building information model; and
      split the parsed information from the building information model into a number of building information objects; and
   the tool interface is configured to split the information from the pre-engineering tool into a number of pre-engineering tool objects.

10. The computing device of claim 9, wherein the computing device includes a model analyzer configured to:
    analyze the building information objects and the pre-engineering tool objects; and
    correlate the building information objects and the pre-engineering tool objects into a model for the HVAC system of the building.

11. The computing device of claim 5, wherein the computing device includes a dimensional transformer configured to generate a two-dimensional diagram of the layout for the HVAC system of the building and a three-dimensional diagram of the layout for the HVAC system of the building.

12. The computing device of claim 5, wherein the computing device includes a wiring layout generator configured to generate a wiring layout map for the HVAC system of the building.

13. The computing device of claim 5, wherein the computing device includes a report generator configured to generate a report that includes the wiring length of the HVAC system of the building.

14. A system for determining a layout and wiring estimation for a heating, ventilation, and air conditioning (HVAC) system of a building, comprising:
  a building information model associated with a building, wherein the building information model includes:
    a floor plan of the building; and
    a number of HVAC devices of an HVAC system of the building;
  a pre-engineering tool associated with the building, wherein the pre-engineering tool includes a wiring diagram that includes a controller and the number of HVAC devices of the HVAC system of the building, wherein the pre-engineering tool is separate from the building information model and determines which of the number of HVAC devices of the HVAC system need to be connected to the controller of the HVAC system in the wiring diagram based on a number of input/output (I/O) assignments for the HVAC devices of the HVAC system, and wherein the number of HVAC devices of the HVAC system include an air handling unit and a chiller; and
  a computing device configured to determine a layout and wiring estimation for the HVAC system of the building based, at least in part, on:
    the floor plan of the building;
    the number of HVAC devices of the HVAC system; and
    the wiring diagram included in the pre-engineering tool that is separate from the building information model;
  wherein the determined wiring estimation for the HVAC system of the building includes a wiring length of the HVAC system of the building.

15. The system of claim 14, wherein the wiring diagram includes a number of I/O points of the HVAC system of the building.

16. The system of claim 14, wherein the computing device is configured to:
  determine a capacity of the HVAC system of the building based, at least in part, on the floor plan of the building; and
  determine a ducting and piping design for the HVAC system of the building based, at least in part, on the floor plan of the building.

17. The system of claim 14, wherein the computing device is configured to send the layout and wiring estimation for the HVAC system of the building to the building information model.

* * * * *